(12) United States Patent
Chen et al.

(10) Patent No.: US 12,261,430 B2
(45) Date of Patent: Mar. 25, 2025

(54) COMPOSITE CIRCUIT PROTECTION DEVICE

(71) Applicant: FUZETEC TECHNOLOGY CO., LTD., New Taipei (TW)

(72) Inventors: Jack Jih-Sang Chen, New Taipei (TW); Chang Hung Jiang, New Taipei (TW)

(73) Assignee: FUZETEC TECHNOLOGY CO., LTD., New Taipei (TW)

( * ) Notice: Subject to any disclaimer, the term of this patent is extended or adjusted under 35 U.S.C. 154(b) by 648 days.

(21) Appl. No.: 17/646,269

(22) Filed: Dec. 28, 2021

(65) Prior Publication Data

US 2023/0208131 A1 Jun. 29, 2023

(51) Int. Cl.
*H02H 9/02* (2006.01)

(52) U.S. Cl.
CPC .................. *H02H 9/026* (2013.01)

(58) Field of Classification Search
CPC ............ H02M 1/32; H02M 2001/322; H02M 2001/327; H02M 1/34; H02M 2001/342; H02M 2001/344; H02M 2001/346; H02M 2001/348; H02M 1/36; H02M 1/38; H02M 1/42; H02M 1/4208; H02M 1/4216; H02M 1/4225; H02M 1/4233; H02M 1/4241; H02M 1/425; H02M 1/4258; H02M 1/4266; H02M 2001/4275; H02M 2001/4283; H02M 2001/4291; H02M 1/10; H02M 3/33561; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; G01R 19/165; G01R 19/16504; G01R 19/16509; G01R 19/16514; G01R 19/16519; G01R 19/16523; G01R 19/16528; G01R 19/16533; G01R 19/16538; G01R 19/16542; G01R 19/16547; G01R 19/16552; G01R 19/16557; G01R 19/16561; G01R 19/16566; G01R 19/16571;

(Continued)

(56) References Cited

U.S. PATENT DOCUMENTS 6,489,879 B1 * 12/2002 Singh .................. H01M 50/581
337/182
7,205,672 B1 * 4/2007 Smith .................... H01L 23/62
257/E23.08

(Continued)

*Primary Examiner* — Jeffrey A Gblende
*Assistant Examiner* — Nusrat Quddus
(74) *Attorney, Agent, or Firm* — HSML P.C.

(57) ABSTRACT

A composite circuit protection device includes a positive temperature coefficient (PTC) component, first and second conductive leads, a solder and a diode component that is connected to the PTC component through the solder. The solder includes a first alloy material having a first melting point, and a second alloy material having a second melting point that is lower than the first melting point. Each of the first and second melting points is independently greater than 190° C. and lower than 308° C. The first and second conductive leads are respectively bonded to the PTC component and the diode component.

19 Claims, 3 Drawing Sheets

(58) Field of Classification Search
CPC .......... G01R 19/16576; G01R 19/1658; G01R 19/16585; G01R 19/1659; G01R 19/16595; G01R 19/17; H02H 7/122; H02H 7/1222; H02H 7/1225; H02H 7/1227; H02H 7/125; H02H 7/1252; H02H 7/1255; H02H 7/1257; G06F 1/263; H01L 25/112; H01L 25/115; H01L 23/34; H01R 13/6675; H01R 29/00; H01R 31/065; G09G 3/20; H02K 11/046; H01F 2027/406; H05K 7/20927; G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; B23K 11/24; H04B 2215/069; H01C 7/028; H01C 7/021; H01C 1/1406

See application file for complete search history.

(56) References Cited

U.S. PATENT DOCUMENTS

| | | | |
|---|---|---|---|
| 10,418,158 B1* | 9/2019 | Chen | H01C 7/028 |
| 10,804,012 B1* | 10/2020 | Chen | H01C 1/1406 |
| 10,971,287 B1* | 4/2021 | Chen | H01C 7/12 |
| 11,335,479 B1* | 5/2022 | Chen | H01C 1/1406 |
| 12,051,924 B2* | 7/2024 | Onuki | H01M 10/48 |
| 2006/0215342 A1* | 9/2006 | Montoya | H01C 1/148 |
| | | | 361/103 |
| 2008/0006897 A1* | 1/2008 | Inaguchi | G01K 7/22 |
| | | | 257/E29.198 |
| 2010/0134942 A1* | 6/2010 | Wang | H01C 7/021 |
| | | | 361/93.7 |
| 2012/0170163 A1* | 7/2012 | Mikolajczak | H01L 29/417 |
| | | | 361/57 |
| 2016/0189897 A1* | 6/2016 | Hasunuma | H01H 85/048 |
| | | | 337/401 |
| 2017/0094758 A1* | 3/2017 | Tochadse | H05B 41/2881 |
| 2021/0305807 A1* | 9/2021 | Chen | H01C 1/1406 |
| 2022/0045532 A1* | 2/2022 | Onuki | H01M 10/44 |
| 2023/0059814 A1* | 2/2023 | Chen | H02H 3/10 |
| 2023/0109145 A1* | 4/2023 | Fujita | H10N 19/00 |
| | | | 257/467 |
| 2023/0377780 A1* | 11/2023 | Chen | H02H 9/042 |
| 2024/0127987 A1* | 4/2024 | Chen | H01C 7/02 |
| 2024/0204264 A1* | 6/2024 | Chen | H01M 10/425 |

* cited by examiner

US 12,261,430 B2

COMPOSITE CIRCUIT PROTECTION DEVICE

FIELD

The disclosure relates to a composite circuit protection device, and more particularly to a composite circuit protection device including a positive temperature coefficient (PTC) component and a diode component connected to each other through a solder which contains at least two alloy materials.

BACKGROUND

A conventional polymeric positive temperature coefficient (PPTC) over-current protection structure includes first and second electrodes 30, a PTC polymer matrix 20 laminated between the first and second electrodes 30, and conductive lead pins 50, 60 respectively bonded to outer surfaces of the first and second electrodes 30 (see FIG. 1). The PTC polymer matrix 20 may be formed with a hole 40 that has an effective volume to accommodate thermal expansion of the PTC polymer matrix 20 at increased temperature.

Electrical properties (e.g., operating current and high-voltage surge endurability) are important factors which affect the occurrence of power surge in the PPTC over-current protection structure. It is noted that the operating current and the high-voltage endurability of the PPTC over-current protection structure may be improved by adjusting the thickness and/or the area of the PTC polymer matrix 20, but the resultant PPTC over-current protection structure may be vulnerable to power surge.

A diode may be used to connect with the PPTC over-current protection structure through a solder in order to further impart over-voltage protection to the resultant composite circuit protection device. In the manufacturing process of such composite circuit protection device, the solder has to effectively bond the diode to the PPTC over-current protection structure, otherwise the electrical properties of the composite circuit protection device may be poor.

SUMMARY

Therefore, an object of the disclosure is to provide a composite circuit protection device that can alleviate at least one of the drawbacks of the prior art.

According to the disclosure, the composite circuit protection device includes a positive temperature coefficient (PTC) component, a solder, a diode component, a first conductive lead and a second conductive lead. The PTC includes a PTC layer having two opposite surfaces, and first and second electrode layers that are respectively disposed on the two opposite surfaces of the PTC layer. The solder includes a first alloy material having a first melting point, and a second alloy material having a second melting point that is lower than the first melting point. Each of the first and second melting points independently being greater than 190° C. and lower than 308° C. The diode component is connected to the second electrode layer of the PTC component through the solder. The first conductive lead is bonded to the first electrode layer of the PTC component. The second conductive lead is bonded to the diode component.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
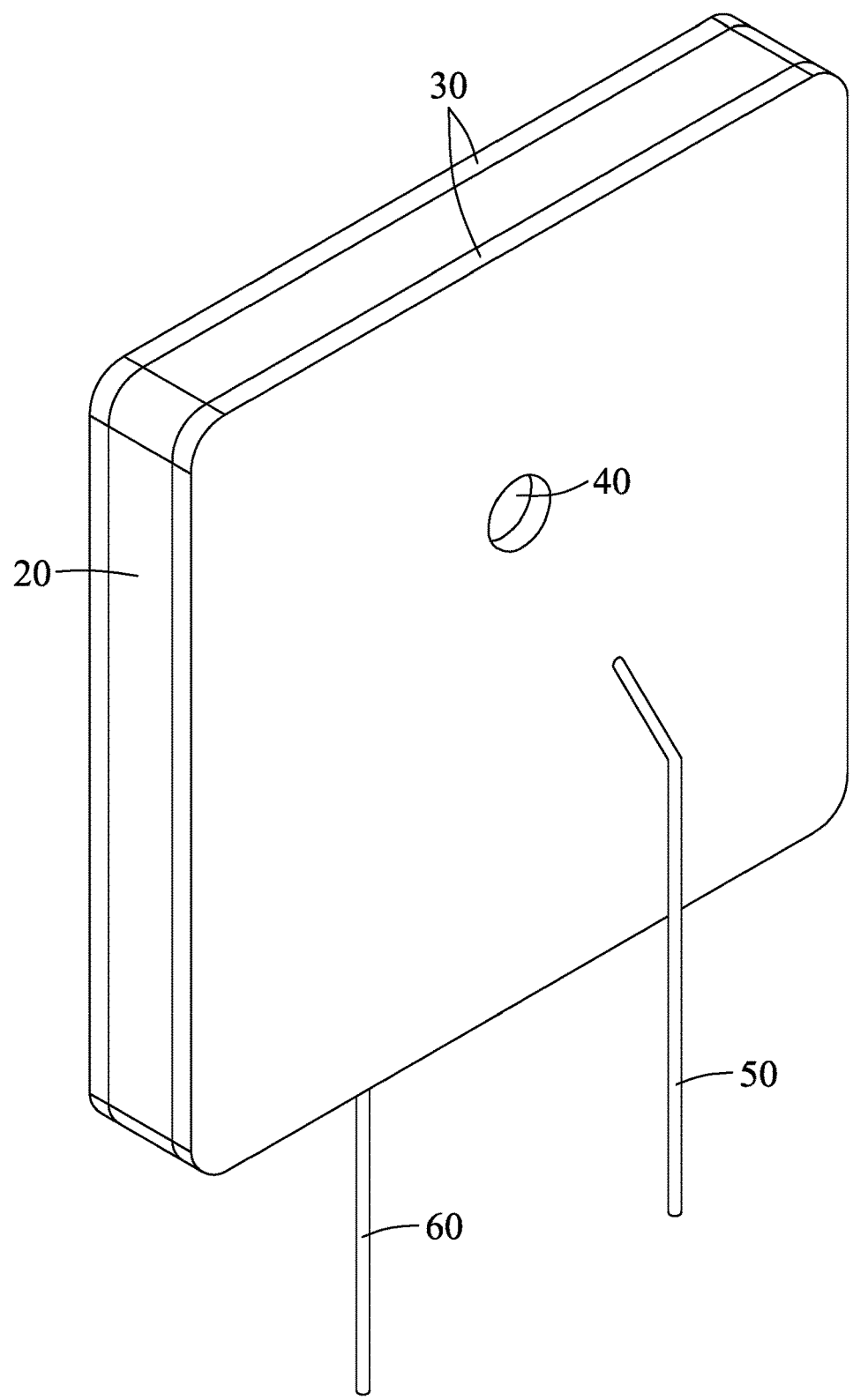
FIG. 1 is a perspective view of a conventional polymer positive temperature coefficient (PPTC) over-current protection structure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
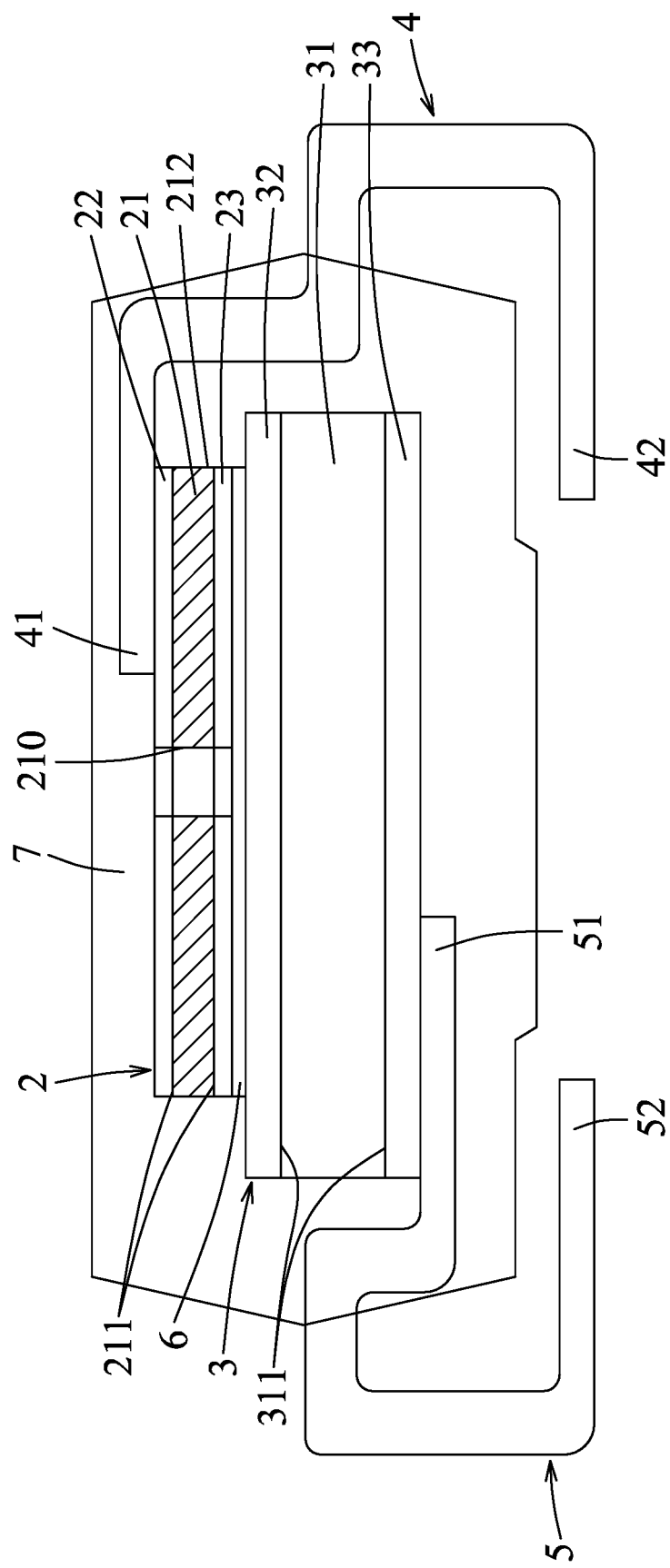
FIG. 2 is a schematic sectional view of a first embodiment of a composite circuit protection device according to the disclosure.

Referring to FIG. 2, a first embodiment of a composite circuit protection device according to the present disclosure includes a positive temperature coefficient (PTC) component 2, a diode component 3, a solder 6, a first conductive lead 4 and a second conductive lead 5.

The PTC component 2 includes a PTC layer 21 having two opposite surfaces 211, and first and second electrode layers 22, 23 respectively disposed on the two opposite surfaces 211 of the PTC layer 21.

According to the disclosure, the PTC component 2 may be formed with a hole 210. In this embodiment, the hole 210 is formed in the PTC layer 21. The PTC layer 21 of the PTC component 2 has a peripheral edge 212 that defines a boundary of the PTC layer 21 and that interconnects the two opposite surfaces 211 of the PTC layer 21. The hole 210 is spaced apart from the peripheral edge 212 of the PTC layer 21, and has an effective volume to accommodate thermal expansion of the PTC layer 21 when the temperature of the PTC layer 21 is increased, so as to avoid undesired structural deformation of the PTC layer 21.

The hole 210 may extend through at least one of the two opposite surfaces 211 of the PTC layer 21. In certain embodiments, the hole 210 further extends through at least one of the first and second electrode layers 22, 23. In this embodiment, the hole 210 extends through the first and second electrode layers 22, 23. In certain embodiments, the hole 210 extends along a line passing through a geometrical center of the PTC layer 21, and is transverse to the opposite surfaces 211 of the PTC layer 21. The hole 210 is defined by a hole-defining wall having a cross section that may be parallel to the opposite surfaces 211 of the PTC layer 21. The cross section of the hole-defining wall may be in a shape of circle, square, oval, triangle, or crisscross, etc.

According to this disclosure, the PTC component 2 may be a polymeric positive temperature coefficient (PPTC) component, and the PTC layer 21 may be a polymeric PTC layer that includes a polymer matrix and a conductive filler dispersed in the polymer matrix. The polymer matrix is made from a polymer composition that contains a non-grafted olefin-based polymer. In certain embodiments, the non-grafted polyolefin is high density polyethylene (HDPE). In other embodiments, the polymer composition further includes a carboxylic acid anhydride-grafted olefin-based polymer. Examples of the conductive filler may include, but are not limited to, carbon black powder, metal powder, electrically conductive ceramic powder, and combinations thereof.

The diode component 3 includes a diode structure 31 having two opposite surfaces 311, and third and fourth electrode layers 32, 33 respectively disposed on the two opposite surfaces 311 of the diode structure 31.

In certain embodiments, the diode component 3 is a transient-voltage-suppression (TVS) diode. The TVS diode may include a silicon wafer having a PN junction.

The diode component 3 has a breakdown voltage at which the diode component 3 begins to conduct current. The PTC component 2 has a rated voltage at which the PTC component 2 is designed to work with. In certain embodiments, the rated voltage of the PTC component 2 ranges between 50% and 100% of the breakdown voltage of the diode component 3 as determined at 1 mA. In other embodiments, the composite circuit protection device trips at an over-voltage that is lower than a sum of of the rated voltage of the PTC component 2 and the breakdown voltage of the diode component 3 as determined at 1 mA.

The solder 6 is used to connect the diode component 3 to the PTC component 2. In certain embodiments, the diode component 3 and the PTC component 2 are connected in series to each other. In other embodiments, the diode component 3 and the PTC component 2 are connected in parallel to each other. The solder 6 may include at least two alloy material. In this embodiment, the solder 6 includes a first alloy material that has a first melting point, and a second alloy material that has a second melting point which is lower than the first melting point. Each of the first and second melting points are independently greater than 190° C. and lower than 308° C. In certain embodiments, each of the first and second melting points independently ranges from 200° C. to 300° C. For example, the first melting point may be not lower than 280° C., such as ranging from 280° C. to 300° C. The second melting point may be not greater than 230° C., such as ranging from 210° C. to 230° C. By using the abovementioned solder 6 to solder the PTC component 2 and the diode component 3 together, the composite circuit protection device formed thereby may have an improved electrical and structural stability.

The first conductive lead 4 is bonded to the first electrode layer 22 of the PTC component 2 through, e.g., the solder 6, or any other conventional solder. In this embodiment, the first conductive lead 4 has a connecting portion 41 bonded to an outer surface of the first electrode layer 22, and a free portion 42 extending outwardly from the connecting portion 41 beyond the first electrode layer 22 for insertion into a pin hole in a circuit board or a circuit device (not shown in the figures).

The second conductive lead 5 is bonded to the diode component 3 through, e.g., the solder 6, or any other conventional solder. In this embodiment, the second conductive lead 5 has a connecting portion 51 bonded to an outer surface of the fourth electrode layer 33 of the diode component 3, and a free portion 52 extending outwardly from the connecting portion 51 beyond the fourth electrode layer 33 for insertion into a pin hole in a circuit board or a circuit device (not shown in the figures).

The composite circuit protection device may further include an encapsulant 7 which encloses the PTC component 2, the diode component 3, the solder 6, a part of the first conductive lead 4 and a part of the second conductive lead 5. In this embodiment, the free portions 42, 52 of the first and second conductive leads 4, 5 are exposed from the encapsulant 7. The encapsulant 7 may be made from epoxy resin.

Figure 3:
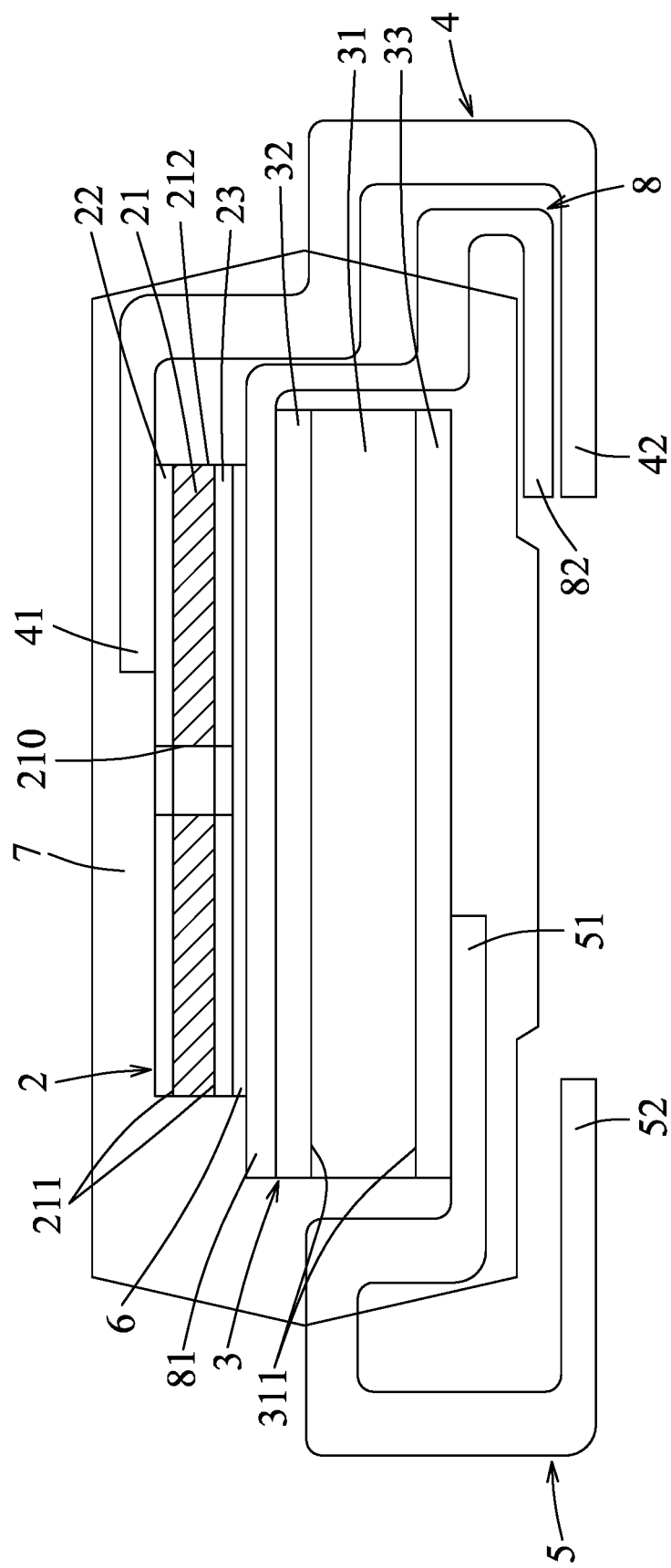
FIG. 3 is a schematic sectional view of a second embodiment of a composite circuit protection device according to the disclosure.

Referring to FIG. 3, a second embodiment of a composite circuit protection device according to the present disclosure is similar to the first embodiment, except that the second embodiment further includes a third conductive lead 8. The third conductive lead 8 is bonded to and disposed between the second and third electrode layers 23, 32 through, e.g., the solder 6, or any other solder. In this embodiment, the third conductive lead 8 has a connecting portion 81 bonded to the second and third electrode layers 23, 32, and a free portion 82 extending outwardly from the connecting portion 81 beyond the second and third electrode layers 23, 32 for insertion into a pin hole in a circuit board or a circuit device (not shown in the figures).

In this embodiment, the encapsulant 7 encloses the PTC component 2, the diode component 3, the solder 6, a part of the first conductive lead 4, a part of the second conductive lead 5, and a part of the third conductive lead 8. The free portions 42, 52, 82 of the first, second and third conductive leads 4, 5, 8 are exposed from the encapsulant 7.

Examples of the disclosure will be described hereinafter. It is to be understood that these examples are exemplary and explanatory and should not be construed as a limitation to the disclosure.

EXAMPLES

<Preparation of a Solder>

Four solder pastes (i.e., solder pastes A, B, C and D), which have different compositions and melting points shown in Table 1, were used to prepare various solders according to the amounts shown in Table 2, so as to be used in the composite circuit protection devices of the following Examples 1 to 5 (E1-E5) and Comparative Examples 1 to 6 (CE1-CE6).

TABLE 1

| Solder paste | Solder paste composition (wt %) | Melting point (° C.) | Source |
|---|---|---|---|
| A | Sn5/Pb95 | 308-312 | Indium Corporation |
| B | Sn5/Pb92.5/Ag2.5 | 287-296 | Indium Corporation |
| C | Sn96.5/Ag3.0/Cu0.5 | 217-221 | Nihon Genma Mfg. Co., Ltd. |
| D | Sn62/Pb37.6/Ag0.4 | 179-190 | Nihon Genma Mfg. Co., Ltd. |

TABLE 2

| | Solder | | | |
|---|---|---|---|---|
| | First solder Paste | wt % | Second solder Paste | wt % |
| E1 | B | 10 | C | 90 |
| E2 | B | 25 | C | 75 |
| E3 | B | 50 | C | 50 |
| E4 | B | 75 | C | 25 |
| E5 | B | 90 | C | 10 |
| CE1 | A | 100 | — | — |
| CE2 | B | 100 | — | — |
| CE3 | C | 100 | — | — |
| CE4 | D | 100 | — | — |
| CE5 | A | 50 | C | 50 |
| CE6 | B | 50 | D | 50 |

Note:
"—" indicates not added

<Preparation of a Composite Circuit Protection Device>

Example 1 (E1)

12.5 g of high density polyethylene (HDPE, purchased from Formosa Plastics Corporation, catalog no.:

HDPE9002) serving as the non-grafted olefin-based polymer, 12.5 g of carboxylic acid anhydrides-grafted HDPE (purchased from Dupont, catalog no.: MB100D) serving as the carboxylic acid anhydride-grafted olefin-based polymer, and 25.0 g of carbon black powder (purchased from Columbian Chemicals Co., catalog no.: Raven 430UB) serving as the conductive filler, were compounded in a Brabender mixer. The compounding procedure was carried out at 200° C. at a stirring rate of 30 rpm for 10 minutes.

The resultant compounded mixture was hot-pressed in a mold at 200° C. under 80 kg/cm² for 4 minutes so as to form a polymeric PTC (PPTC) layer with a thickness of 0.6 mm. Two copper foil sheets (serving as the first and second electrode layers) were respectively attached to two opposite surfaces of the PPTC layer, and were then hot-pressed at 200° C. under 80 kg/cm² for 4 minutes so as to form a PPTC laminate having a sandwiched structure. The PPTC laminate was then cut into a plurality of PPTC chips, each having a size of 4.0 mm×4.0 mm. The PPTC chips were irradiated with a Cobalt-60 gamma ray for a total irradiation dose of 150 kGy. A central portion of each PPTC chips was punched to form a through hole which was defined by a hole-defining wall with a circular cross section that has a diameter (d) of 0.15 mm and an area ($\pi d^2/4$) of around 0.0177 mm². The PPTC chip was determined to have the following characteristics according to the Underwriter Laboratories UL 1434 Standard for Safety for Thermistor-Type Devices:
  (1) a hold current (i.e., a maximum current value which can be applied in normal operation) of 0.2 A,
  (2) a trip current (i.e., a minimum current value which is necessary for the PPTC chip to achieve a high-resistance state) of 0.4 A,
  (3) a rated voltage (i.e., a voltage at which the PPTC chip is designed to work with) of 60 V,
  (4) a withstand voltage (i.e., a maximum voltage limit which will not cause the PPTC chip to be malfunctioned or damaged) of 60 V, and
  (5) a rated resistance (i.e., resistance value at 25° C.) of 2 ohm to 3 ohm.

A TVS diode (purchased from Lucky Forests Corporation, Catalogue no: SMCJ90A) was provided, and was determined to have the following characteristics according to the Underwriter Laboratories UL 497B Standard for Safety for Transient Voltage Surge Suppressors:
  (1) a breakdown voltage ($V_{BR}$, i.e., the voltage which the TVS diode begins to conduct current) of 100 V to 111 V at 1 mA, and
  (2) a maximum clamping voltage (i.e., peak voltage measured across the TVS diode at a peak impulse current $I_{pp}$ of 10.3 A, and an impulse waveform of 10/1000 µs) of 146 V.

The solder prepared according to Table 2 was applied onto the PPTC chip, and the TVS diode was disposed on the solder. Then, first and second conductive leads were respectively soldered to one of the copper foils sheets of the PPTC chip and the TVS diode. The obtained product was placed in a reflow oven and was subjected to a reflow soldering process, so as to form a composite circuit protection device (abbreviated as soldered device) of E1. The reflow soldering process is conducted under the following conditions for 4 minutes: a peak temperature of the reflow oven was set at 320° C. so as to control a reflow zone (also known as time above liquids, TAL) at a liquidus temperature of not less than 305° C. for 20 seconds.

Examples 2 to 5 (E2 to E5)

The composite circuit protection devices of E2 to E5 were prepared by procedures and conditions generally similar to those of E1, except for the compositional difference of the solders used (see Tables 1 and 2).

Comparative Examples 1 to 4 (CE1 to CE4)

The composite circuit protection devices of CE1 to CE4 were prepared by procedures and conditions generally similar to those of E1, except that only solder paste A, only solder paste B, only solder paste C and only solder paste D were respectively used in CE1, CE2, CE3 and CE4 (see Tables 1 and 2).

Comparative Examples 5 and 6 (CE5 and CE6)

The composite circuit protection devices of CE5 and CE6 were prepared by procedures and conditions generally similar to those of E1, except for the compositional difference of the solders used (see Tables 1 and 2).
Performance Test
Solderability Test For each of the soldered devices of E1 to E5 and CE1 to CE6, solderability of such devices was calculated using following equation (1). The results are shown in Table 3.

$$\text{Solderability} = X/Y \times 100\% \tag{1}$$

wherein: X=an area of the PPTC chip soldered to a surface of the TVS diode
Y=an area of the surface of the TVS diode

TABLE 3

| | Solderability (%) |
|---|---|
| E1 | 100 |
| E2 | 100 |
| E3 | 100 |
| E4 | 100 |
| E5 | 100 |
| CE1 | — |
| CE2 | 90 |
| CE3 | 75 |
| CE4 | 45 |
| CE5 | — |
| CE6 | 55 |

Note:
"—" indicates not available

As shown in Table 3, the solderability of the soldered devices of CE1 and CE5 are not available because the solders (solder paste A to be specific) used for soldering the PPTC chip to the TVS diode under the abovementioned reflow soldering conditions hardly melt, resulting in relatively poor soldering between the PPTC chip and the TVS diode, and thus, the area of the PPTC chip that is soldered to the surface of the TVS diode is unmeasurable. The soldered devices of CE2 to CE4 and CE6 show solderability ranging only from 45% to 90%. Solder paste that has a high flowability under the conditions of the reflow soldering process causes the TVS diode and the PPTC chip easily slide over each other and thus a poor soldering. In contrast, the soldered devices of E1 to E5 show 100% solderability, which indicates successful and improved soldering.
Resistance Test Ten soldered devices of each of E1 to E5 and CE1 to CE6 as obtained above were subjected to a resistance test using a micro-ohm meter so as to determine resistances of the PPTC chips at room temperature, and the average value thereof are shown in Table 4.

Maximum Clamping Voltage Test

Ten soldered devices of each of E1 to E5 and CE1 to CE6 were subjected to determination of clamping voltages of the TVS diodes at a peak impulse current of 10.3 A and an impulse waveform of 10/1000 μs using a diode testing meter (Manufacturer: Poworld Electronic Co., Ltd.; Model No.: VC6880A), and the average value thereof are shown in Table 4.

TABLE 4

| | Resistance of soldered PPTC chip (ohm) | Clamping voltage of soldered TVS diode (V) |
|---|---|---|
| E1 | 2.45 | 126.4 |
| E2 | 2.47 | 126.5 |
| E3 | 2.52 | 122.2 |
| E4 | 2.55 | 123.5 |
| E5 | 2.59 | 124.6 |
| CE1 | 5.23 | 148.5 |
| CE2 | 5.15 | 135.5 |
| CE3 | 2.65 | 154.5 |
| CE4 | 2.62 | 160.7 |
| CE5 | 4.45 | 147.5 |
| CE6 | 4.33 | 155.7 |

In regard to the soldered devices of CE1 to CE4, the soldered PPTC chips of CE1 and CE2 show resistances of 5.23 ohm and 5.15 ohm, respectively, which are undesirably greater than the characteristic rated resistance (2 ohm to 3 ohm) of the PPTC chips measured before the reflow soldering process, and the soldered TVS diodes of CE1, CE3 and CE4 show clamping voltages ranging from 148.5 V to 160.7 V, which are undesirably greater than the characteristic maximum clamping voltage (146 V) of the TVS diodes measured before the reflow soldering process. The results indicate that the soldered devices of CE1 to CE4, which were prepared using solders including only one solder paste for soldering the PPTC chip to the TVS diode, fail to retain the characteristic electrical properties of the PPTC chips and the TVS diodes, resulting in unsatisfactory electrical stability.

With regard to the soldered devices of CE5 to CE6, the soldered PPTC chips thereof show resistances of 4.45 ohm and 4.33 ohm which are greater than the characteristic rated resistance of the PPTC chips measured before the reflow soldering process, and the soldered TVS diodes after soldering show clamping voltages of 147.5 V and 155.7 V, which are also greater than the characteristic maximum clamping voltage of the TVS diodes measured before the reflow soldering process. The results indicate that the soldered devices of CE5 and CE6, which were prepared using solders that includes two different solder pastes, one of which either has too high melting point (such as not less than 308° C. for the solder paste A) or too low melting point (such as not greater than 190° C. for the solder paste D), fail to retain the characteristic electrical properties of the PPTC chips and the TVS diodes, thus resulting in unsatisfactory electrical stability.

In contrast, for the soldered devices of E1 to E5, the soldered PPTC chips have resistances all falling within the characteristic rated resistance of the PPTC chips measured before the reflow soldering process, and the soldered TVS diodes have clamping voltages less than the characteristic maximum clamping voltage of the TVS diodes measured before the reflow soldering process. This indicates that the soldered devices of E1 to E5, which were prepared using solders each including two different solder pastes and each having a melting point being greater than 190° C. and lower than 308° C., are capable of retaining the characteristic electrical properties of the PPTC chip and the TVS diode, so as to improve electrical stability.

To conclude, by virtue of the solder 6 including the first and second alloy materials, each having a melting point that is greater than 190° C. and lower than 308° C., the composite circuit protection device including the PTC component 2 connected to the diode component 3 through such solder 6 may achieve excellent structural and electrical stability.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A composite circuit protection device, comprising:
    a positive temperature coefficient (PTC) component that includes
        a PTC layer having two opposite surfaces, and
        first and second electrode layers respectively disposed on said two opposite surfaces of said PTC layer;
    a solder that includes a first alloy material having a first melting point, and a second alloy material having a second melting point that is lower than said first melting point, each of said first and second melting points independently being greater than 190° C. and lower than 308° C.;
    a diode component that is connected to said second electrode layer of said PTC component through said solder;
    a first conductive lead that is bonded to said first electrode layer of said PTC component; and
    a second conductive lead that is bonded to said diode component,
    wherein said composite circuit protection device trips at an over-voltage that is lower than a sum of a rated voltage of said PTC component and a breakdown voltage of said diode component as determined at 1 mA.

2. The composite circuit protection device of claim 1, wherein each of said first and second melting points independently ranges from 200° C. to 300° C.

3. The composite circuit protection device of claim 1, wherein said first melting point is not lower than 280° C.

4. The composite circuit protection device of claim 3, wherein said first melting point ranges from 280° C. to 300° C.

5. The composite circuit protection device of claim 1, wherein said second melting point is not greater than 230° C.

6. The composite circuit protection device of claim 5, wherein said second melting point ranges from 210° C. to 230° C.

7. The composite circuit protection device of claim 1, wherein said PTC component is formed with a hole.

8. The composite circuit protection device of claim 1, wherein said PTC component and said diode component are connected in series to each other.

9. The composite circuit protection device of claim 1, wherein said PTC component and said diode component are connected in parallel to each other.

10. The composite circuit protection device of claim 1, wherein said PTC component has a rated voltage that ranges between 50% and 100% of a breakdown voltage of said diode component as determined at 1 mA.

11. The composite circuit protection device of claim 1, wherein said diode component is a transient-voltage-suppression (TVS) diode.

12. The composite circuit protection device of claim 11, wherein said TVS diode includes a silicon wafer having a PN junction.

13. The composite circuit protection device of claim 1, wherein said PTC layer of said PTC component includes a polymer matrix and a conductive filler dispersed in said polymer matrix.

14. The composite circuit protection device of claim 13, wherein said polymer matrix is made from a polymer composition containing a non-grafted olefin-based polymer.

15. The composite circuit protection device of claim 14, wherein said non-grafted olefin-based polymer is high density polyethylene.

16. The composite circuit protection device of claim 14, wherein said polymer composition further includes a carboxylic acid anhydride-grafted olefin-based polymer.

17. The composite circuit protection device of claim 13, wherein said conductive filler is selected from the group consisting of carbon black powder, metal powder, electrically conductive ceramic powder, and combinations thereof.

18. The composite circuit protection device of claim 1, further comprising an encapsulant enclosing said PTC component, said diode component, said solder, a part of said first conductive lead and a part of said second conductive lead.

19. The composite circuit protection device of claim 18, wherein said encapsulant is made from epoxy resin.

* * * * *